2,879,301
METHOD FOR THE PREPARATION OF PHOSPHINE BORINES

Robert D. Stewart, Whittier, and David R. Stern, Los Angeles, Calif., assignors to American Potash & Chemical Corporation, a corporation of Delaware No Drawing. Application February 21, 1956
Serial No. 566,763

8 Claims. (Cl. 260—606.5)

This invention relates to the preparation of phosphine borines and particularly to the preparation of the mono-, di- and tri-P-substituted phosphine borines; these materials are useful for the preparation of the valuable phosphinoborines.

It has been previously proposed to prepare such phosphine borines by a method including the use of diborane (Burg and Wagner, J. Am. Chem. Soc., 75, 3872, [1955]). Since diborane is expensive, toxic, and explosive, it is believed to be obvious that our method is one of value because it does not require diborane.

We have found that phosphine borine and the various substituted phosphine borines can be prepared by the reduction of the corresponding phosphine trihaloborine with an alkali metal hydride, an alkaline earth hydride or a mixed metal hydride, e.g., sodium hydride, lithium hydride, potassium hydride, calcium hydride, strontium hydride, barium hydride, sodium borohydride and lithium aluminum hydride in a suitable solvent. The phosphine borines may or may not be isolated after preparation. The reaction involved with lithium aluminum hydride can be represented as follows:

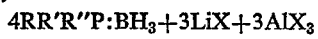

4RR'R"P:BX$_3$+3LiAlH$_4$→
    4RR'R"P:BH$_3$+3LiX+3AlX$_3$ in which X represents fluorine, chlorine or bromine and R, R' and R" represent hydrogen or any aliphatic or aromatic radical. Lower alkyl groups are particularly suitable. It should be kept in mind that if R, R' and R" contain a reactive group which is reducible by the hydride employed as a reducing agent, such group may be reduced in the process.

While any phosphine trihaloborines can be used, those containing fluorine are preferred because the fluoride salts formed as by-products are usually insoluble in the ethers which are usually employed as solvents, enabling the insoluble by-product salts to be removed readily by filtration. Lithium aluminum hydride is preferred as a reducing agent because of its ready solubility in the ethers which are usually used as solvents.

As illustrative of the practice of the invention, the following examples are set forth by way of illustration and not by way of limitation:

Example I.—Into a 250 ml. flask containing a magnetic stirrer and 18.0 ml. of anhydrous ethyl ether, 257.4 cc. of boron trifluoride and 245.3 cc. of dimethylphosphine were added together. A sidearm contained 0.3311 gram lithium aluminum hydride. The flask was sealed under vacuum and the lithium aluminum hydride added to the ether solution slowly with stirring. Upon completion of the reaction the flask was opened to a vacuum system and the ether distilled out through a −35° reflux head. The flask was resealed and placed in a 195° oven for 20¾ hours. The flask was then opened and washed out with methanol. A total of 0.2333 gram dimethylphosphinoborine (28.8% theoretical) was recovered from the methanol.

Example II.—Into a 500 ml. bulb, 1.5460 grams (914 cc.) lithium aluminum hydride, 13 ml. ether, 1052 cc. dimethylphosphine and 1051.4 cc. boron trifluoride were placed at −196° C. The bulb was then sealed under vacuum and allowed to warm up to room temperature. After 16 hours, the bulb was opened to the vacuum line and the ether removed through a −35° reflux head. The product was then distilled into a 1-liter bulb which was sealed under vacuum and placed in a 195° oven. After 15 hours, the bulb was opened and 1.1753 grams dimethylphosphinoborine was recovered. This represents a 33.8% yield.

Example III.—Into a 250 ml. flask containing 25 ml. of ether and a magnetic stirrer, 277.9 cc. boron trichloride and 274.6 cc. dimethylphosphine were condensed together. The flask was sealed under vacuum and allowed to warm up to room temperature. A sidearm contained 0.4012 gram (236.8 cc.) lithium aluminum hydride and this material was now added slowly to the reaction mixture with stirring. Upon completion of the reaction, the ether was removed through a −40° reflux head under vacuum. The product was then distilled into a 500 ml. bulb which was sealed under vacuum and placed in a 195° oven for sixteen hours. The bulb was then opened and 0.2967 gram dimethylphosphinoborine recovered. This represents a 30.6% yield of final product.

Example IV.—308.8 cc. of dimethylphosphine trifluoroborine was dissolved in 21.5 ml. of ethyl ether and 0.4237 g. of lithium aluminum hydride added. The solution was filtered and the dimethylphosphine borine separated from the filtrate by fractional distillation. The product was pyrolyzed at 190° C. for 15 hours to give dimethylphosphinoborine. A total of 0.6805 g. dimethylphosphinoborine was produced. This represents a yield of 66.6%.

In certain places in the examples preceding, various quantities in cubic centimeters (cc.) appear. It is common in high vacuum work to refer any given quantity of material, whether solid or otherwise, to an equivalent volume of gas at standard temperature and pressure. Given a quantity in moles, the cc. volume may be ascertained by multiplying this number by 22.4.

We claim:

1. A process for the preparation of a lower alkyl-substituted phosphine borine consisting of reducing a lower alkyl-substituted phosphine trihaloborine with a hydride selected from the group consisting of an alkali metal hydride, an alkaline earth metal hydride, lithium aluminum hydride and sodium borohydride in an inert solvent for each of said reactants and in the absence of water.

2. The process of claim 1 wherein the material used to reduce said phosphine trihaloborine is lithium aluminum hydride.

3. The process of claim 1 wherein the phosphine trihaloborine is a phosphine trifluoroborine and the material used as the reducing agent is calcium hydride.

4. The process of claim 1 wherein the phosphine trihaloborine is a phosphine trifluoroborine and wherein the reducing agent is sodium hydride 5. The process of claim 1 wherein the phosphine trihaloborine is a phosphine trifluoroborine and wherein the reducing agent is sodium borohydride.

6. The process of claim 1 wherein the phosphine trihaloborine is a phosphine trifluoroborine and the reducing agent is lithium hydride.

7. The process of claim 1 wherein the phosphine trihaloborine is a phosphine trichloroborine and wherein the reducing agent is lithium aluminum hydride.

8. The process of claim 1 wherein the phosphine trihaloborine is a phosphine trifluoroborine and the reducing agent is lithium aluminum hydride.

References Cited in the file of this patent

Hewitt et al.: Journal Chemical Society (London), 1953, pp. 530–4.